(12) United States Patent
Fernandez et al.

(10) Patent No.: US 9,796,813 B1
(45) Date of Patent: Oct. 24, 2017

(54) FILTER ALIGNMENT IN A POLYCARBONATE PRODUCTION PROCESS

(71) Applicant: SABIC GLOBAL TECHNOLOGIES B.V., Bergen op Zoom (NL)

(72) Inventors: Ignacio Vic Fernandez, Murcia (ES); William E. Hollar, Jr., Mt. Vernon, IN (US); Donald E. Owens, III, Mt. Vernon, IN (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/522,858

(22) PCT Filed: Oct. 30, 2015

(86) PCT No.: PCT/IB2015/058409
§ 371 (c)(1),
(2) Date: Apr. 28, 2017

(87) PCT Pub. No.: WO2016/083923
PCT Pub. Date: Jun. 2, 2016

(30) Foreign Application Priority Data

Nov. 25, 2014 (EP) .................................. 14382472

(51) Int. Cl.
*C08G 64/40* (2006.01)
*C08G 64/22* (2006.01)
*C08G 64/42* (2006.01)

(52) U.S. Cl.
CPC ........... *C08G 64/226* (2013.01); *C08G 64/40* (2013.01); *C08G 64/403* (2013.01); *C08G 64/406* (2013.01); *C08G 64/42* (2013.01)

(58) Field of Classification Search
CPC ..... C08G 64/40; C08G 64/403; C08G 64/406
USPC ..................................................... 528/502 A
See application file for complete search history.

(56) References Cited

U.S. PATENT DOCUMENTS

| 5,414,057 A | 5/1995 | Campbell et al. |
| 5,525,701 A | 6/1996 | Tominari et al. |
| 6,492,485 B1 | 12/2002 | Gohr et al. |
| 2004/0147655 A1 | 7/2004 | Sawaki et al. |
| 2008/0255324 A1 | 10/2008 | Kakihara et al. |
| 2011/0127468 A1* | 6/2011 | Pudleiner ............. C08G 64/406 252/301.35 |
| 2017/0015784 A1 | 1/2017 | Fernandez |

FOREIGN PATENT DOCUMENTS

| CN | 101547957 A | 9/2009 |
| CN | 101631816 | 1/2010 |
| EP | 1760105 A1 | 3/2007 |
| EP | 2174970 A1 | 4/2010 |
| EP | 2540758 A1 | 1/2013 |
| EP | 2692765 A1 | 2/2014 |
| EP | 2692766 A1 | 2/2014 |
| EP | 2703424 A1 | 3/2014 |
| EP | 2947110 A1 | 11/2015 |
| JP | H0665366 A | 3/1994 |
| JP | H06234845 A | 8/1994 |
| JP | 2003034722 A | 2/2003 |
| JP | 2004050137 A | 2/2004 |
| WO | 2016079706 A1 | 5/2016 |

OTHER PUBLICATIONS

International Search Report for International Application No. PCT/IB2015/058409; International Filing Date Oct. 30, 2015; dated Feb. 11, 2016; 5 pages.
Written Opinion of the International Search Report for International Application No. PCT/IB2015/058409; International Filing Date Oct. 30, 2015; dated Feb. 11, 2016; 5 pages.

* cited by examiner

*Primary Examiner* — David Buttner
(74) *Attorney, Agent, or Firm* — Cantor Colburn LLP

(57) ABSTRACT

In an embodiment, a polycarbonate polymerization process comprises interfacially polymerizing a carbonate compound and dihydroxy compound in the presence of an interfacial catalyst to form a polycarbonate and adding a viscosity reducing agent and a transesterification catalyst to polycarbonate upstream of a first filter to form an adjusted polycarbonate. The first filter can be replaced with a replacement filter and the adjusted polycarbonate can be introduced to the replacement filter. The flow can be diverted to a replacement filter. The process further comprises reducing the addition rate of the viscosity reducing agent and the transesterification catalyst until the addition rate is 0 mol/hr.

16 Claims, 2 Drawing Sheets

FILTER ALIGNMENT IN A POLYCARBONATE PRODUCTION PROCESS

CROSS REFERENCE TO RELATED APPLICATIONS

This application is a National Stage application of PCT/IB2015/058409, filed Oct. 30, 2015, which claims the benefit of European Application No. 14382472.0, filed Nov. 25, 2014, both of which are incorporated by reference in their entirety herein.

TECHNICAL FIELD

This disclosure relates to a process for aligning a filter in a polycarbonate polymerization process.

BACKGROUND

In polymerization processes of producing polycarbonate, a filter is often used after polymerization to remove contaminants such as gels, agglomerated additives, and carbonized polymer particles from the polycarbonate. The successful removal of such contaminants can be especially important in producing polycarbonates with good optical properties.

When a change in pressure across the filter reaches a certain level, the filter needs to be replaced. Replacement entails shutting down the system, and replacing the spent filter with a new filter. This process can take several hours to properly shut down the system, remove the spent filter, properly align the new filter, and restart the system. In an attempt to expedite the process, the alignment of the new filter is often rushed. This can result in a misaligned filter which will likely become damaged. A damaged filter, even having just a small break, that is not easily detectable with, for example, a pressure sensor, can disadvantageously result in the presence of particulates in the product polycarbonate. Consequently, the filter will again need to be replaced.

Clearly, filter replacement in any polycarbonate process is a source of reduced efficiency and hence an area for improvement. This is particularly the case in larger production polycarbonate processes as the impact of each hour of down time is more significant. Many typical polycarbonate process plants have a capacity of less than or equal to 35 tons per day. Replacement of a filter in such a plant can result in productivity loss of 2 to 4 hours of production. In larger polycarbonate plants, the productivity loss can be in the order of tenths of tons.

Improved methods for changing a filter in a polymerization process (e.g., an interfacial polymerization process) are needed.

BRIEF DESCRIPTION

Disclosed herein is a method for switching a filter in a polycarbonate polymerization process.

In an embodiment, a polycarbonate polymerization process, comprises interfacially polymerizing a carbonate compound and dihydroxy compound in the presence of an interfacial catalyst to form a polycarbonate; adding a viscosity reducing agent and a transesterification catalyst to polycarbonate upstream of a first filter to form an adjusted polycarbonate; replacing the first filter with a replacement filter; introducing the adjusted polycarbonate to the replacement filter; and reducing the addition rate of the viscosity reducing agent and the transesterification catalyst until the addition rate is 0 mol/hr.

In another embodiment, a polycarbonate polymerization process, comprises interfacially polymerizing phosgene and dihydroxy compound in the presence of a solvent, a chain stopper, and an interfacial catalyst to form a polycarbonate; adding a viscosity reducing agent and a transesterification catalyst to the polycarbonate upstream of a first filter to form an adjusted polycarbonate; diverting the flow of the adjusted polycarbonate to a replacement filter; and reducing the addition rate of the viscosity reducing agent and the transesterification catalyst until the addition rate is 0 mol/hr.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
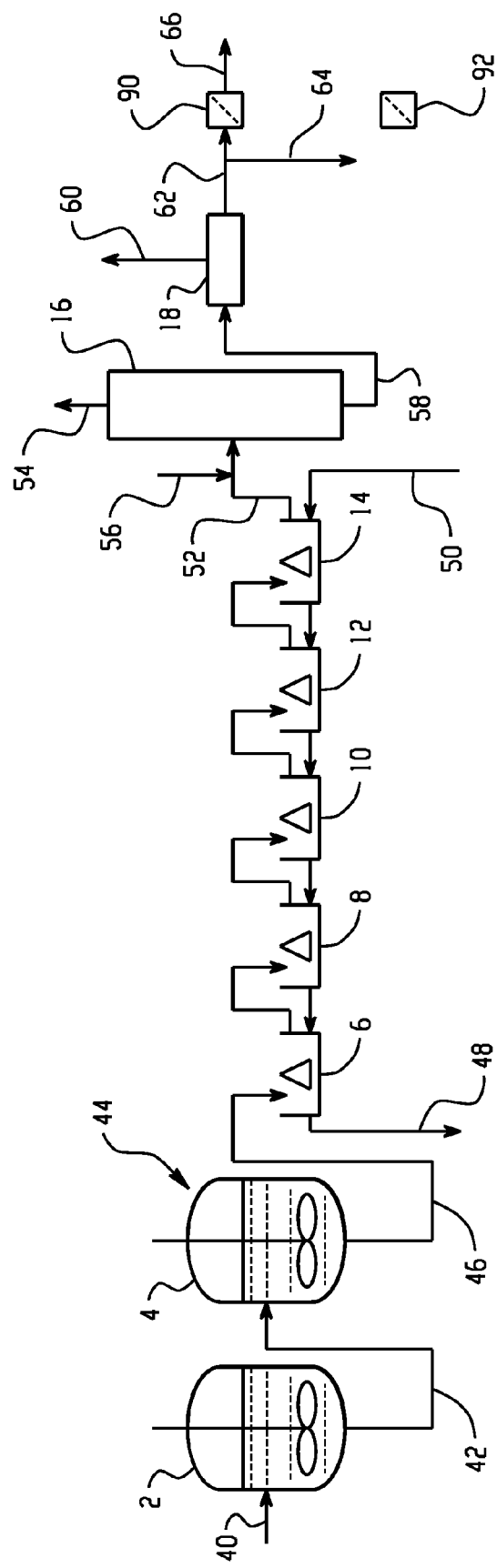
FIG. 1 is an illustration of an embodiment of a process of changing a filter.

When changing a filter, for example, a melt filter in a polycarbonate polymerization, the viscosity of the polycarbonate needs to be controlled as introducing polycarbonate with a high viscosity (e.g., greater than or equal to 300 Pascal seconds (Pas)) to a new filter can result in damage to the filter if the pressure differential through the filter exceeds the filter's operating parameters (e.g., the pressure differential can exceed 80 bars gauge (barg), for example, greater than 100 barg). Damage to the filter (e.g., by distorting, cracking, or otherwise failing), allows gels and particulates formed during the production process to contaminate the polycarbonate product. Previous methods of changing a filter include changing the processing conditions (e.g., temperatures, pressures, flow rates) from an initial state to reduce the viscosity of the polycarbonate, replacing the filter, introducing the reduced viscosity polycarbonate to the filter, and slowly ramping the processing conditions back to the initial state. This process results in disadvantages such as long change over time and large amounts of waste production due to damage to the replacement filter.

In the present process for exchanging the filter, the Applicants found that by adding an amount of a viscosity reducing agent to the polymerization unit, they could control viscosity during the filter replacement and alignment process without having to change the process conditions in the polymerization unit (e.g., without system shutdown and without changing system processing conditions (e.g., temperatures, pressures, flow rates)). For example, the flow rates, pressures, and temperatures, in the polymerization upstream of the filter, change by less than or equal to 12% based on the stream's average flow rate, pressure, and temperature, respectively, during normal polymerization conditions, (i.e., the average polymerization conditions when operating at steady state). As used herein, steady state is the operating condition to attain a desired molecular weight polycarbonate, other than the conditions during start-up, changing of the filter, and shutdown. The process comprises adding a viscosity reducing agent to a polycarbonate stream, upstream of a replacement filter such that when the polycarbonate is introduced to the replacement filter, a change in pressure across the replacement filter will be within the replacement filter's use parameters (i.e., below a pressure differential that will damage the filter). Once the reduced viscosity polycarbonate is flowing through the replacement filter, the amount of the viscosity reducing agent added to the polycarbonate stream is decreased until no viscosity reducing agent is added to the polycarbonate stream and the polycarbonate viscosity has returned to a desired viscosity. The rate at which the amount of viscosity reducing agent is reduced can be based upon the pressure differential across the replacement filter as the polycarbonate viscosity increases (e.g., to prevent the pressure differential from exceeding the operating parameters of the replacement filter). Optionally, the pressure differential can be monitored with pressure sensor(s) and the rate of reduction of the viscosity reducing agent can be controlled using a controller, based upon the sensed pressure differential. The viscosity reducing agent can be added to the polycarbonate so that a change in pressure across the filter is less than or equal to 12 bars, specifically, less than or equal to 10 bars.

The current process has the advantage of one or more of: a hold-up can be avoided, the change over time can be reduced (e.g., the change over time can be reduced from 3 to 6 hours to less than 20 minutes (min)), and the amount of waste or off-spec PC (as used herein off-spec polycarbonate refers to polycarbonate that does not meet the desired specifications, where, for example, the molecular weight is too low or too high, the amount of contaminants in the polycarbonate is too high, or the properties are not acceptable (e.g., transparency, haze, mechanical properties)) generated during the filter alignment process can be reduced. For example, in a large production facility with a production rate of 100,000 tons per year (tons/yr) a standard change over time of 3 hours would result in 36 tons of waste and/or off-spec polycarbonate. Reducing the change over time to one tenth of that time reduces the amount of waste and/or off-spec polycarbonate generated to just 4 tons. Hence, significant savings and improvements can be realized with the present process, which is especially evident in large scale polycarbonate production plants, e.g., greater than 55,000 tons per day (tons/day), particularly greater than or equal to 75,000 tons/day, and especially greater than or equal to 100,000 tons/day, and even greater than or equal to 125,000 tons/day.

After filter alignment, the rate of addition of the viscosity reducing agent can be decreased to zero and the polymer viscosity can be restored to its original value.

"Polycarbonate" as used herein means a polymer or copolymer having repeating structural carbonate units of formula (1), wherein at least 60 percent of the total number of $R^1$ groups are aromatic or each $R^1$ contains at least one $C_{6-30}$ aromatic group. Each $R^1$ can be derived from a dihydroxy compound such as an aromatic dihydroxy compound of formula (2) or a bisphenol of formula (3). In formula (2), each $R^h$ is independently a halogen atom, for example, bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

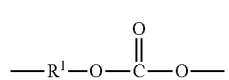

(1)

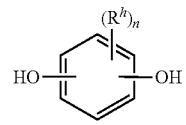

(2)

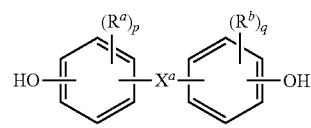

(3)

In formula (3), $R^a$ and $R^h$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. Accordingly, p and q can each be 0, or p and q can each be 1, and $R^a$ and $R^h$ can each be a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently H, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl) diphenyl methane, bis(4-hydroxyphenyl)-1-naphthylmethane, 1,2-bis(4-hydroxyphenyl) ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxy phenyl)isobutene, 1,1-bis(4-hydroxyphenyl) cyclododecane, trans-2,3-bis(4-hydroxy phenyl)-2-butene, 2,2-bis(4-hydroxyphenyl)adamantane, alpha,alpha'-bis(4-hydroxyphenyl) toluene, bis(4-hydroxyphenyl)acetonitrile, 2,2-bis(3-methyl-4-hydroxy phenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxy phenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA", in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), and from bisphenol A and 1,1-bis(4-hydroxy-3-methylphenyl)-3,3,5-trimethylcyclohexane (isophorone bisphenol).

The polycarbonate can be a linear homopolymer containing bisphenol A carbonate units (BPA-PC); or a branched, cyanophenyl end-capped BPA-PC.

The polycarbonate can be a copolycarbonate. Specific copolycarbonates include those derived from bisphenol A and bulky bisphenol carbonate units, i.e., derived from bisphenols containing at least 12 carbon atoms, for example, 12 to 60 carbon atoms, specifically, 20 to 40 carbon atoms. Examples of such copolycarbonates include copolycarbonates comprising BPA units and 2-phenyl-3,3'-bis(4-hydroxyphenyl) phthalimidine carbonate units (a BPA-PPPBP copolymer), a copolymer comprising BPA units and 1,1-bis(4-hydroxy-3-methylphenyl)cyclohexane carbonate units (a BPA-DMBPC copolymer), and a copolymer comprising BPA units and isophorone bisphenol carbonate units (available, for example, under the trade name APEC from Bayer).

Polycarbonates manufactured and purified as described herein are suitable for use in a wide variety of compositions and applications. Thus, an additive composition can be added, e.g., in an extruder, to the polycarbonate to form a polycarbonate composition. The additive composition can be one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble and/or non-soluble in polycarbonate.

The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. A combination of a heat stabilizer, mold release agent, and ultraviolet light stabilizer can be used. The total amount of the additive composition (other than any impact modifier, filler, or reinforcing agent) can be 0.001 to 10.0 weight percent (wt %), or 0.01 to 5 wt %, based on the total weight of the polymer in the composition.

The polycarbonate can be made by an interfacial polymerization process. The interfacial polymerization can be a continuous process, a semi-batch process, or a batch process. Although the reaction conditions for interfacial polymerization can vary, an exemplary process generally involves dissolving or dispersing a dihydroxy compound in aqueous caustic soda or potash, adding the resulting mixture to a water immiscible solvent medium, and contacting the reactants with a carbonate compound in the presence of an interfacial catalyst (also referred to as a phase transfer catalyst) such as a tertiary amine, under controlled pH conditions, e.g., 8 to 10. The water immiscible solvent can comprise an aromatic chlorohydrocarbon and/or an aliphatic chlorohydrocarbon. The solvent can comprise methylene chloride, ethylene dichloride, 1,2-dichloroethane, 1,1,1-trichloroethane, 1,1,2-trichloroethane, chlorobenzene, carbon tetrachloride, toluene, benzene, xylene, anisole, or a combination comprising on or more of the foregoing. The solvent can comprise a low-boiling temperature solvent such as dichloromethane and a high-boiling temperature solvent such as chlorobenzene, for example, in a solvent ratio of 1:2 to 2:1. The aqueous phase can comprise tetrahydrofuran, 1,3/1,4-dioxane, 1,3-dioxolane, water, or a combination comprising one or more of the foregoing.

The carbonate compound can include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. The carbonate compound can comprise phosgene. The carbonate compound can comprise a diaryl carbonate (such as an activated diaryl carbonate). Combinations comprising at least one of the foregoing types of carbonate compounds can also be used. The diaryl carbonate ester can be diphenyl carbonate, or an activated diphenyl carbonate having electron-withdrawing substituents on each aryl, such as bis(4-nitrophenyl) carbonate, bis(2-chlorophenyl)carbonate, bis(4-chlorophenyl)carbonate, bis(methyl salicyl) carbonate, bis(4-methylcarboxylphenyl) carbonate, bis(2-acetylphenyl) carboxylate, bis(4-acetylphenyl) carboxylate, or a combination comprising one or more of the foregoing. An interfacial polymerization reaction to form carbonate linkages can use phosgene as a carbonate compound, and is referred to as a phosgenation reaction.

The interfacial catalyst can comprise a tertiary amine. The tertiary amine can comprise an aliphatic tertiary amine (such as triethylamine and tributylamine), a cycloaliphatic tertiary amine (such as N,N-diethyl-cyclohexylamine), an aromatic tertiary amine (such as N,N-dimethylaniline), or a combination comprising one or more of the foregoing. Among the interfacial catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Examples of phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl⁻, Br⁻, a $C_{1-8}$ alkoxy group or a $C_{6-18}$ aryloxy group. An effective amount of a phase transfer catalyst can be 0.1 to 10 wt %, or 0.5 to 2 wt %, each based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures comprising one or more of the foregoing functional groups. The branching agents can comprise trimellitic acid, trimellitic anhydride, trimellitic trichloride, 1,1,1-tris(4-hydroxyphenyl)ethane, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt % based on the total weight of the polycarbonate. Combinations comprising linear and branched polycarbonates can be used.

The content of the following branching structures can be less than or equal to 2,000 parts per million by weight (ppm), specifically, less than or equal to 1,000 ppm, more specifically, less than or equal to 900 ppm, even more specifically, less than or equal to 500 ppm.

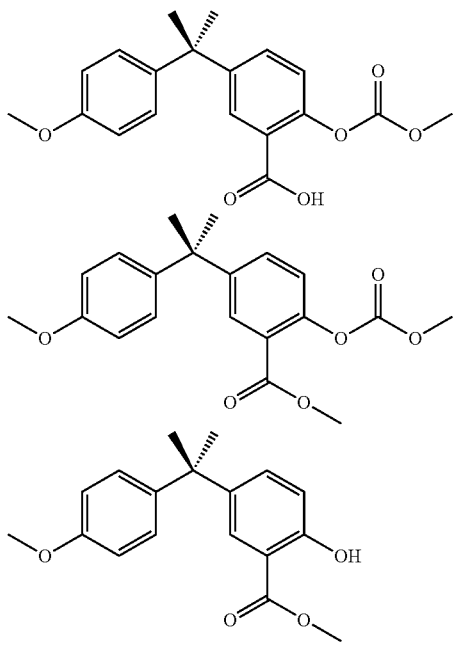

A branching agent can be employed in the polymerization and can result in an increase in polymer melt strength. The branching agent (for example, 1,1,1-tris-(hydroxy phenyl) ethane (THPE)) can be introduced to the polymerization unit as a solution of the branching agent dissolved in a branching solvent. The branching solvent selected for dissolving the branching agent can be any solvent capable of dissolving the branching agent at a level sufficient to deliver or introduce the desired amount of branching agent into the polymerization unit. The branching solvent can comprise lower alkanols, such as $C_{1-4}$ alkanols, including methanol, ethanol, propanol (such as n-propanol and isopropanol), n-butanol, or a combination comprising one or more of the foregoing.

The branching agent can be introduced in an amount such that it will result in a polycarbonate comprising up to 1.5 mole percent (mol %), specifically, up to 1.0 mol %, more specifically, up to 0.5 mol % branching agent in the final branched polycarbonate. The amount of dissolved branching agent present in the solution can be an amount of 0.5 to 50 wt %, specifically, 5 to 40 wt %, more specifically, 15 to 35 wt % relative to the total weight of the branching agent and solvent solution. The polycarbonate can comprise a branching agent in the amount of 100 to 5,000 ppm, specifically, 500 to 4,000 ppm, more specifically, 1,000 to 3,500 ppm based on the total amount of polycarbonate repeat units.

All types of polycarbonate end groups are contemplated as being useful in the polycarbonate composition, provided that such end groups do not significantly adversely affect desired properties of the compositions. A chain stopper (also referred to as an end capping agent) can be included during polymerization. The chain stopper limits molecular weight growth rate, and so controls molecular weight in the polycarbonate. Examples of chain stoppers include certain mono-phenolic compounds, mono-carboxylic acid chlorides, and/or mono-chloroformates. Mono-phenolic chain stoppers are exemplified by monocyclic phenols such as phenol and $C_{1-22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example, 4-substituted-2-hydroxy benzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used as chain stoppers. These include monocyclic, mono-carboxylic acid chlorides such as benzoyl chloride, $C_{1-22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

The polymerization can comprise a branching agent comprising 1,1,1-tris(4-hydroxyphenyl)ethane or a combination of trimellitic trichloride and 1,1,1-tris(4-hydroxy phenyl) ethane. The polymerization can comprise a chain stopper comprising phenol or a phenol containing a substituent of cyano group, aliphatic groups, olefinic groups, aromatic groups, halogens, ester groups, ether groups, or a combination comprising at least one of the foregoing. The chain stopper can comprise phenol, p-t-butylphenol, p-methoxyphenol, p-cyanophenol, p-cumylphenol, or a combination comprising at least one of the foregoing.

The polycarbonate can be a branched polycarbonate comprising units as described above; greater than or equal to 3 mole percent (mol %), based on the total moles of the polycarbonate, of moieties derived from a branching agent; and end-capping groups derived from an end-capping agent having a pKa of 8.3 to 11.

In general, polymerization of polycarbonate utilizes a polymerization unit that can comprise a continuously stirred tank reactor(s) (CSTR), a tubular reactor(s), a centrifuge(s) (such as a disc-type centrifuge and a CINC™ centrifuge), a heat exchanger(s), a decanter(s), a separating coalescer(s), an extraction column(s), a devolatilizer(s), an extruder(s), a scrubber(s), a filter(s), or combinations comprising one or more of the foregoing. For example, the polymerization unit can comprise one or more reactors, for example, one or more CSTRs and/or one or more tubular reactors that can each independently act as a polymerization vessel. The reactor(s) can be operated in a batch mode, a semi-batch mode, or a continuous mode.

After the polymerization, the polycarbonate can be fed to a purification system to separate the organic phase comprising the polycarbonate from the aqueous phase and to purify the organic phase from impurities such as salts, ions, and the interfacial catalyst. The purification system can comprise a centrifuge(s) (such as a disc-type centrifuge and a CINC™ centrifuge), a heat exchanger(s), a decanter(s), a separating coalescer(s), an extraction column(s), or a combination comprising one or more of the foregoing.

The polycarbonate (for example that is still in solution) can be fed to a preheater, for example, to remove water and/or solvent. The preheater can be any device that allows for heat transfer from a heat transfer medium (such as condensing steam or hot oil) to the polycarbonate. The preheater can be a heat exchanger, for example, a tubular heat exchanger. In the preheater, the polycarbonate is heated to a temperature high enough to lower the residual water in the powder, but low enough to prevent decomposition of the polycarbonate. The temperature of the polycarbonate can be 50 to 320° C., specifically, 75 to 300° C., more specifically, 90 to 300° C., even more specifically, 165 to 250° C.

The polycarbonate can be devolatilized in a devolatization step. The devolatization can comprise a flash devolatilization step. The devolatization can comprise a devolatization extrusion. The devolatization can comprise a direct isolation step. The devolatization can comprise a whipped film step. The devolatization can comprise a dewatering extrusion step. The devolatization can comprise a foaming devolatization step. The devolatization can comprise a steam precipitation step. The devolatization can comprise a hot water precipitation step. The devolatization can comprise a gel crush step. The devolatization can comprise a combination comprising one or more of the foregoing devolatization steps. The devolatizing can occur prior to extruding. The devolatization can comprise a devolatization unit with an attached collection pot and melt pump.

The flash devolatilizer can comprise an inlet element and a separator. The inlet element allows the polycarbonate to enter the gas space of the separator, in which the polymer solution separates and the volatile constituents are removed, resulting in removal of gaseous vapors. The inlet element can be designed in various ways, for example, as a flash valve, as a distributor plate with upstream product distributor, or as one or more essentially horizontal pipes with orifices at the bottom. "Essentially horizontal" means that the pipe relative to the horizontal has an angle of less than or equal to 20°, specifically, less than or equal to 10°, and more specifically, 0°. The temperature of the polycarbonate entering the flash devolatilizer can be 180° C. to 300° C., specifically, 200° C. to 250° C. The absolute pressure in the separator of the flash devolatilizer can be 0.3 to 6 bar, specifically, 0.5 to 4 bar, more specifically, 1 to 2 bar.

Devolatizing extrusion utilizes a devolatizing extruder that comprises a devolatilizer and a vented extruder. The devolatizing extruder can be a downpipe devolatizer and/or a foaming devolatizer. The devolatizing extruder can be designed such that the cone of the downpipe devolatilizer is arranged at right angles on one of the first housing of the vented extruder, where at least 70%, specifically, 100% of the cross section of the screws, open in the upward direction, and is available as an inlet orifice for the polycarbonate falling downward out of the downpipe devolatilizer. The downpipe devolatizer can comprise a shell and tube heat exchanger, where the tubes are arranged vertically on a separator that comprises an exit orifice for removal of gaseous vapors and a separation vessel where the polycarbonate can separate. The polycarbonate can leave the downpipe devolatizer and can pass directly into the vented extruder. An entrainment compound (such as nitrogen, argon, carbon dioxide, water, methane, helium, or a combination comprising one or more of the foregoing) can be mixed with the polycarbonate. The entrainment compound can be added, for example, prior to entering the devolatizing extruder and/or into one or more housings of the vented extruder portion of the devolatizing extruder. The entrainment compound can act as a foaming compound, for example, if the sum of the vapor pressures of the volatile components (residual solvents and foaming agents) is greater than or equal to 1 bar more than the pressure in the separator.

The direct isolation step can comprise evaporating an organic solvent from a solution that contains the solvent and the polycarbonate to obtain a material system that contains 90 to 99.95 wt % polycarbonate based on the total weight of the system; passing the material system through inlet openings of a separating vessel to obtain a plurality of streams of polycarbonate; and degassing the streams in the separating vessel at a pressure of 0.1 to 20 millibars (mbar). On entry into the inlet openings, the material system can be supersaturated with volatile constituents to an extent of at least 1 bar and can have a temperature of 250 to 340° C. and a flow rate of 0.1 to 20 kilograms per hour (kg/hour).

The direct isolation step can comprise, in a first stage of the process, passing the polycarbonate through one of a combination of a tubular heat exchanger with one of a thin-film evaporator and a coiled tube evaporator; and a tubular heat exchanger. The evaporators can comprise a downstream separator. In further stages, the polycarbonate can be further concentrated and degassed in a tubular heat exchanger having a downstream separator. The subsequent stages can have increasing temperature and pressure.

The steam precipitation can comprise introducing a heated polycarbonate, for example, that was heated in a preheater, to a steam precipitation apparatus. Examples of steam precipitation apparatuses are described in U.S. Pat. Nos. 5,475,084, 3,508,339, 5,317,083 and 5,615,831. The steam precipitation apparatus can comprise a Venturi jet design such as that shown in U.S. Pat. No. 5,615,831. The temperature of the steam can be sufficiently high to vaporize a solvent such as methylene chloride, but sufficiently low to avoid fusion of polycarbonate particles caused by melting. Similarly, the pressure can be sufficiently high to supply a driving force for the devolatization, but low enough to minimize condensation of the steam. The temperature of the steam precipitation can be 145 to 260° C. The pressure of the steam precipitation can be 685 to 1,500 kiloPascal (kPa) gauge. The steam to polycarbonate weight ratio can be 1 to 4, specifically, 1.2 to 2.5.

The dewatering extrusion can comprise a steam precipitation of the polycarbonate and then either feeding the polycarbonate directly to a devolatization extruder; devolatizing in a column dryer and then feeding to a devolatization extruder; compacting the polycarbonate in a chilsonator and then feeding the polycarbonate to a devolatization extruder; or devolatizing the polycarbonate in a column dryer, compacting the polycarbonate in a chilsonator, and feeding the polycarbonate to a devolatization extruder. In the devolatization extruder, the polycarbonate can be melted, for example, it can be melted by the time it reacts ½ the length of the extruder, specifically, ⅓ the length of the extruder.

Gel crush comprises forming a gel and then kneading to form a powder. The process can comprise feeding the polycarbonate solution continuously to a kneader (e.g., a kneader reactor such as a LIST Unit) while heating, mixing and kneading. The kneading can be accomplished by producing a limited back and forth (or "to and fro" movement) of the polycarbonate solution, e.g., with the aid of a set of spiral blades mounted on rotating shafts in an elongated barrel. This "gel crush" process is further described in U.S. Pat. No. 4,074,864 to Narita et al. Optionally, a hot water precipitation can be performed upstream of the kneader (i.e., prior to the kneader).

After devolatization, the polycarbonate can be dried in one or more dryers (e.g., hot air dryers) to convert a wet powder to a dry powder. Examples of dryers are those commercially available from Niro Soavi, S.p.A. of Italy. The PC exiting a last dryer can comprise less than or equal to 1 wt %, specifically, less than or equal to 0.1 wt % of volatiles.

The polycarbonate can be extruded in an extruder (such as a dewatering extruder and/or a devolatilizing extruder) and subjected to filtration. The filter can be located upstream of and/or downstream of the extruder. It is noted that the polymerization unit can comprise a first and a second parallel line, wherein the first parallel line is connected to the filter located upstream from the extruder, and wherein the second parallel line is connected to a second filter that is located upstream from a second extruder. The extruder can include steam precipitation and methylene chloride devolatilization. The process can comprise an isolation, for example, that produces a wet powder for entry to the extruder.

Figure 2:
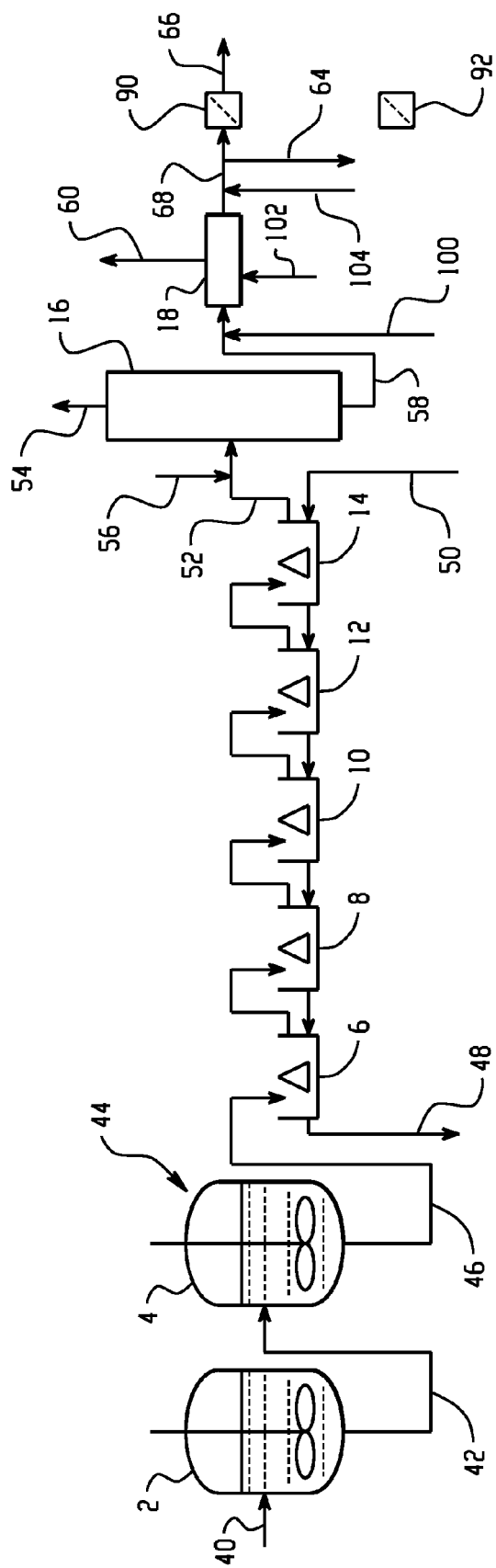
FIG. 2 is an illustration of an embodiment of a process for changing a filter where a viscosity reducing agent is added.

An interfacial polymerization unit is depicted in FIG. 1, where it is noted that while FIGS. 1 and 2 illustrate an interfacial polymerization comprising mixers and a series of centrifuges, that one skilled in the art can readily envision interfacial polymerization schemes. For example, the reactors can comprise tubular reactor(s); one or more centrifuges can be replaced with decanter(s), coalescer(s), extraction column(s), or a combination comprising one or more of the foregoing; a heater(s) can be present; a devolatization unit(s) can be present; a dryer(s) can be present; etc. FIG. 1 shows that stream 40 enters first mixer 2. Stream 40 can comprise a chainstopper (also referred to as an end-capping agent), a dihydroxy monomer, a water immiscible solvent (such as mono-chlorobenzene and methylene chloride), water, an aqueous base (such as sodium hydroxide), a carbonate compound, an interfacial catalyst, or a combination comprising one or more of the foregoing. It is noted that one or more of stream 40 can enter first mixer 2 and can comprise one or more components. Stream 42 exits first mixer 2 in continuous mode and enters second mixer 4. Stream 44 enters second mixer and can comprise an interfacial catalyst. A polycarbonate exits second mixer 4 as stream 46 that is directed to a purification system. FIG. 1 illustrates a purification system comprising counter-current centrifuges 6-14. Cleaning stream 50 enters centrifuge 14 and exits centrifuge 10 as stream 48. It is noted that while cleaning stream 50 passes through all of centrifuges 6-14, one or more cleaning streams can pass through one or more centrifuges. Stream 52 exits centrifuge 16 and enters concentrator 16. The concentrator 16 can be a devolatization unit. The concentrator 16 and the extruder 18 can be a single apparatus, for example, a devolatization extruder. Stream 56 can enter stream 52 or can directly enter concentrator 16. Stream 56 can comprise, for example, a water immiscible solvent such as methylene chloride, ethylene dichloride, 1,2-dichloroethane, chlorobenzene, toluene, or a combination comprising one or more of the foregoing and/or an entrainment compound such as nitrogen, argon, carbon dioxide, water, methane, helium, or a combination comprising one or more of the foregoing. Streams 54 and 58 exit concentrator 16, where stream 54 can comprise, for example, methylene chloride. Stream 58 enters extruder 18, where stream 60 comprising volatiles exits extruder 18 and extruded stream 62 comprising the polycarbonate enters filter first 90. Filtered stream 66 exits the first filter 90. During the lifetime of the first filter 90, filter 90 is used to filter the polycarbonate and second filter 92 is on standby. When it is time to change the filter, the first filter 6 is replaced with the second filter 8. Specifically, filter replacement can occur via the following procedure:

1) Throughput in the polymerization unit is reduced by at least 25%, for example, by increasing the hold up in the final polymerization unit (it is noted that the monomer feed can be maintained) and the feed to the extruder, polymer stream 22, is reduced as much as possible. 2) The reaction conditions in the polymerization unit are changed. 3) The first filter 90 is then exchanged for the second filter 92 and extruded stream 62 is diverted as diverted stream 64. Extruded stream 62 is diverted due to, for example, increased residence time in the polymerization unit, where the resultant polymer no longer meets product specifications. 4) Once the filter is replaced, plant throughput is increased by increasing the feed to the extruder and the reaction conditions are changed to adjust the polycarbonate back into specification. The polycarbonate produced during this time is generally off-spec polycarbonate, taking as much as 3 hours (hr) to regain the desired specifications.

Likewise, in a semi-batch polymerization, throughput in the polymerization unit is reduced by at least 25% or is stopped all together.

The alignment procedure described above, results in many disadvantages. First, the change over time is more than one hour, a lot of off-spec polycarbonate as diverted stream 64 is generated. Second, polymer entrainment and/or an increased level of carbonized polymer can occur in the final polymerization unit due to polymer hold-up during the switching of the filter. Third, the hold-up in the polymerization unit cannot be controlled and is therefore dependent upon the plant operator, who must change the operating parameters both before and after the filter alignment. Lastly, if the pressure drop is close to the maximum allowable pressure drop or if the pressure suddenly peaks as polymer is introduced to the new filter, then the operator must either divert the extruded stream 62 to diverted stream 64 or reduce plant throughput by increasing polymerization unit hold-up in order to prevent failure of the filter.

Due to the many disadvantages of the previous procedure, the Applicants found that by adding an amount of a viscosity reducing agent to the polycarbonate (e.g., into, upstream of, or downstream of the polymerization unit, but upstream of the filter) they could control viscosity during the filter replacement. The replacement and alignment process can comprise: starting a flow of a viscosity reducing agent and a transesterification catalyst upstream of a first filter; redirecting a polycarbonate stream from entering the filter to a diverted stream; replacing the filter with another filter (the replacement filter); redirecting the polycarbonate from the diverted stream into the new filter; and reducing the flow rate of the viscosity reducing agent and a transesterification catalyst. If there are two lines such that a second filter can be installed, the replacement and alignment process can comprise: starting a flow of a viscosity reducing agent and a transesterification catalyst upstream of a first filter; when the viscosity of the polycarbonate in the stream to the first filter is at a viscosity that can be introduced to the second filter without creating a pressure differential greater than the maximum pressure rating of the second filter, redirecting the lowered viscosity polycarbonate stream from entering the first filter into the second filter; and then reducing the flow rate of the viscosity reducing agent and a transesterification catalyst. Thereafter, the first filter can optionally be replaced. When the second filter needs to be replaced, the process is repeated, redirecting the flow of the polycarbonate stream from the spent filter to the new filter.

The filter can be located downstream of an extruder, such that an extruded polycarbonate enters the filter and/or can be located upstream of the extruder, where the extruder can be a devolatizing extruder. When the filter is located upstream of the extruder, the filter can be upstream or downstream of a devolatization unit. The viscosity reducing agent is added upstream of the filter. For example, the viscosity reducing agent can be added in an extruder, in a devolatization extruder, downstream of a devolatization unit and upstream of an extruder, downstream of an extruder and upstream of an a filter, downstream of a devolatization unit and upstream of a filter, or a combination comprising one or more of the foregoing. The viscosity reducing agent can be added to an extrusion section in a devolatizing extruder. The viscosity reducing agent can be added to a whipped film device. The viscosity reducing agent can be added via side feeder at the mid-point of the extruder, for example, to a melted polycarbonate.

The current process can be monitored by a feedback loop that monitors the pressure drop across the replacement filter and/or the stream parameter (e.g., melt volume rate (MVR), molecular weight, and/or polymer viscosity) of the polycarbonate during introduction of the polycarbonate and that directs the adjustment of the flow rate of the viscosity reducing agent and a transesterification catalyst based on either or both of the measured pressure drop and the measured stream parameter.

The current process has the advantage of one or more of a hold-up can be avoided, the change over time can be reduced (for example, from three hours to less than or equal to 30 minutes, specifically, 20 to 30 minutes) and the amount of waste stream and/or off-spec polycarbonate can be reduced. Furthermore, after filter alignment, the rate of addition of the viscosity reducing agent can be decreased to zero and the polymer viscosity can be easily restored to its original value.

The viscosity reducing agent can be any agent that reduces the viscosity of the polycarbonate. The viscosity reducing agent can comprise an inert agent that merely acts to decrease the concentration of the polycarbonate and/or an active agent that acts to break the polymer chains. For example, the viscosity reducing agent can comprise a monomer used in the polymerization process, water, a solvent compatible with polycarbonate, a carbonate compound compatible with polycarbonate, a dihydroxy compound compatible with polycarbonate, or an additional amount of a polymerization by-product. For example, if the polymerization occurring in the polymerization unit is the polymerization of a bisphenol A homopolycarbonate, then the polymerization can occur by the following scheme:

In this scheme, diphenyl carbonate (DPC) reacts with bisphenol A (BPA) to form the polycarbonate (PC) and phenol (PhOH) as a by-product. During filter alignment, either or both of additional phenol and diphenol carbonate can be added. When phenol is added, the phenol breaks the polymer chains, which results in a reduction in viscosity. When diphenol carbonate is added, it acts as an active agent and breaks the polymer chains. Water addition would have a similar effect as the diphenol carbonate and would result in chain scission of the polycarbonate. This reduction in viscosity allows flow through the filter at an acceptable pressure differential through the filter, where damage to the filter can be avoided. The viscosity can then be increased (e.g., by decreasing chain scission) and the pressure can be increased, without damage to the filter. The viscosity reducing agent can be added in an amount of 0.01 to 5 wt %, specifically, 0.05 and 2 wt %, more specifically, 0.05 to 1 wt % based on the total weight of the polycarbonate stream.

The viscosity reducing agent can comprise a diaryl carbonate (such as diphenyl carbonate, bis-methylsalycilate carbonate, bis paracumyl phenol carbonate, bis p-terbutyl phenol carbonate), a dialkyl carbonate (such as dimethyl carbonate, diethyl carbonate, and dibutyl carbonate), an aryl alkyl carbonate (such as methyl phenyl carbonate and ethyl phenyl carbonate, methylsalycil phenyl carbonate, paracumyl phenyl carbonate), a dihydroxy compound (such as a bisphenol (such as BPA)), a monohydroxy compound (such as an alkyl alcohol (such as methanol, propanol, and butanol) and an aryl alcohol (such as phenol, paracumyl phenol, or p-tertbutyl phenol)), water or a combination comprising one or more of the foregoing. The viscosity reducing agent can comprise certain mono-phenolic compounds, mono-carboxylic acid chlorides, and mono-chloroformates. The viscosity reducing agent can comprise a mono-phenolic viscosity reducing agent (such as a monocyclic phenol such as phenol and $C_{1-22}$ alkyl-substituted phenols such as p-cumyl-phenol, dicumyl phenol, resorcinol monobenzoate, and p-tertiary-butyl phenol); a monoether of diphenol (such as p-methoxyphenol); a $C_{8-9}$ alkyl-substituted phenol with branched chain alkyl substituents; or a combination comprising one or more of the foregoing. The viscosity reducing agent can comprise a mono-phenolic UV absorber, for example, 4-substituted-2-hydroxybenzophenones and their derivatives, aryl salicylates, monoesters of diphenols (e.g. resorcinol monobenzoate), 2-(2-hydroxyaryl)-benzotriazoles and their derivatives, 2-(2-hydroxyaryl)-1,3,5-triazines and their derivatives, and the like. The viscosity reducing agent can comprise a mono-carboxylic acid chloride, such as monocyclic, mono-carboxylic acid chlorides (such as benzoyl chloride, $C_{1-22}$ alkyl-substituted benzoyl chloride, tolyl chloride, halogen-substituted benzoyl chloride, bromobenzoyl chloride, cinnamoyl chloride, and 4-nadimidobenzoyl chloride); polycyclic, mono-carboxylic acid chlorides (such as trimellitic anhydride chloride, and naphthoyl chloride); and combinations of monocyclic and polycyclic mono-carboxylic acid chlorides. The viscosity reducing agent can comprise a chloride of aliphatic monocarboxylic acids with less than or equal to 22 carbon atoms; a functionalized chloride of an aliphatic monocarboxylic acid (such as acryloyl chloride and methacryoyl chloride); a mono-chloroformate (such as monocyclic, mono-chloroformates (such as phenyl chloroformate, alkyl-substituted phenyl chloroformate, and p-cumyl phenyl chloroformate, toluene chloroformate); or a combination comprising one or more of the foregoing. The viscosity reducing agent can comprise DPC, methyl phenyl carbonate, dimethyl carbonate, diethyl carbonate, ethyl phenyl carbonate, phenol, BPA, paracumyl phenol, p-tert butyl phenol, water, or a combination comprising one or more of the foregoing. The viscosity reducing agent can comprise a combination comprising one or more of the foregoing.

An amount of a transesterification catalyst can be added with the viscosity reducing agent. The transesterification catalyst can be mixed with the viscosity reducing agent and added to the polymerization system or can be added separately. The amount of transesterification catalyst employed can be $1 \times 10^{-2}$ to $1 \times 10^{-5}$, specifically, $1 \times 10^{-3}$ to $1 \times 10^{-4}$ moles per total mole of the dihydroxy compounds in the reaction mixture. The addition rate of the transesterification catalyst can be returned to zero, for example, 0 moles per hour (mol/hr) corresponding to the reduction rate of the viscosity reducing agent.

The transesterification catalyst can comprise a quaternary ammonium compound (for example, of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion), a quaternary phosphonium compound (for example, of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion), a source of alkali ion, a source of alkaline earth ions, or a combination comprising one or more of the foregoing. Where $X^-$ is a polyvalent anion such as carbonate or sulfate it is understood that the positive and negative charges in the quaternary ammonium and phosphonium structures are properly balanced. For example, where $R^{20}$ to $R^{23}$ are each methyl and $X^-$ is carbonate, it is understood that $X^-$ represents 2 ($CO_3^{-2}$). The transesterification catalyst can comprise a catalyst of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. One or both of the quaternary ammonium compound and the quaternary phosphonium compound can each independently be a compound, for example, a hydroxide, halide, acetate, phenoxide, carboxylate, sulfonate, sulfate, formate, carbonate, or bicarbonate.

The transesterification catalyst can comprise sources of alkali metal ions and can include the alkali metal hydroxides such as illustrated by lithium hydroxide, sodium hydroxide, potassium hydroxide, and combinations comprising at least one of the foregoing. Examples of alkaline earth metal hydroxides are calcium hydroxide, magnesium hydroxide, and combinations comprising at least one of the foregoing. Of these, sodium hydroxide can be used. Other possible sources of alkaline earth and alkali metal ions include salts of carboxylic acids (such as sodium acetate) and derivatives of ethylene diamine tetraacetic acid (EDTA) (such as EDTA tetrasodium salt, and EDTA magnesium disodium salt), as well as combinations comprising at least one of the foregoing. For example, the transesterification catalyst can comprise alkali metal salt(s) of a carboxylic acid, alkaline earth metal salt(s) of a carboxylic acid, or a combination comprising at least one of the foregoing. In another example, the transesterification catalyst comprises $Na_2Mg$ EDTA or a salt thereof.

The transesterification catalyst can comprise sodium hydroxide, tetrabutylammonium hydroxide, methyltributylammonium hydroxide, tetrabutylammonium acetate, tetrabutylphosphonium hydroxide, tetrabutylphosphonium acetate, tetrabutyl phosphonium phenolate, potassium hydroxide, sodium hydroxide, cesium carbonate, tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate (TPPA), tetraphenyl phosphonium phenoxide (TPPP), tetramethyl ammonium hydroxide, tetrabutyl ammonium hydroxide, tetramethyl ammonium acetate, tetramethyl ammonium formate, tetrabutyl ammonium acetate, salt(s) of a non-volatile inorganic acid (such as $NaH_2PO_3$, $NaH_2PO_4$, $Na_2HPO_3$, $NaHCO_3$, $Na_2CO_3$, $KH_2PO_4$, $CsH_2PO_4$, $Cs_2HPO_4$, $Cs_2CO_3$), mixed alkali metal salt(s) of phosphoric acid (such as $NaKHPO_4$, $CsNaHPO_4$, $CsKHPO_4$), or a combination comprising at least one of the foregoing. The transesterification catalyst can comprise a potassium sodium phosphate of the formula $NaKHPO_4$.

The viscosity reducing agent and the transesterification catalyst can be added before and/or into the extruder, as is illustrated in FIG. 2. FIG. 2 shows that one or more of agent streams 100, 102, and 104 can be added. For example, agent stream 100 can add a viscosity reducing agent and a transesterification catalyst to stream 58 upstream of extruder 18, agent stream 102 can add a viscosity reducing agent and a transesterification catalyst directly to extruder 18, and agent stream 104 can be added to stream 62. Reduced viscosity stream 68 is redirected as diverted stream 64 and first filter 90 is replaced with second filter 92. When second filter 92 is inline, reduced viscosity stream 68 is redirected to second filter 92, where second filter 92 can tolerate reduced viscosity stream 68 such that no damage is imparted to the membrane of second filter 92. The flow rate of the viscosity reducing agent and the transesterification catalyst can then be reduced allowing for an increase in the viscosity of the polycarbonate and ultimately in an increase in the pressure across the filter. The increase in pressure across the filter can be a controlled increase, for example, with a feedback loop that monitors the pressure across the filter and adjusts the flow rate of the viscosity reducing agent and the transesterification catalyst. It is noted that in a polymerization process, where an extruder is not employed, the viscosity reducing agent and the transesterification catalyst can be added upstream of the filter, e.g., mixed in a CSTR and/or in an in-line mixer.

Specifically, the process of switching a filter can involve: adding a viscosity reducing agent and a transesterification catalyst, for example, such that the extruded polymer has an MVR of greater than or equal to 20 centimeters cubed per 10 minutes ($cm^3$/10 min), specifically, 20 to 190 $cm^3$/10 min, more specifically, 25 to 100 $cm^3$/10 min, and yet more specifically, 30 to 70 $cm^3$/10 min, or 20 to 40 $cm^3$/10 min at 300 degrees Celsius (° C.) under a load of 1.2 kilograms (kg) according to ASTM D1238-04; diverting the flow of the polymer; exchanging a first filter with a second filter; aligning the second filter; directing the flow of the reduced viscosity polymer through the second filter; and reducing the rate of addition of the viscosity reducing agent and the transesterification catalyst to 0 mol/hr. The reduction of the rate of addition of the viscosity reducing agent and the transesterification catalyst can be a gradual reduction and can occur via the control of a preprogrammed sequence. In other words, this step can be performed without an operator. When the addition rate of the viscosity reducing agent and the transesterification catalyst is back to 0, then the MVR of the polymer can return to what it was prior to its addition and can be the same as the MVR of the polymer exiting the final polymerization unit. As used herein the final polymerization unit refers to the unit that performs the final polymerization and where after exiting the final polymerization unit, the polymer does not increase in molecular weight by more than 10%, for example, a weight average molecular weight does not increase by more than 10%. It is noted that the current process can occur such that none of the operating conditions other than the addition of the viscosity reducing agent and the transesterification catalyst are changed. This is particularly important as it minimizes the transition period for changing the filter and returning to the specifically desired polycarbonate (e.g., MVR, etc.).

During the current process the end-cap ratio of a polycarbonate produced during the filter alignment can be such that it does not drop below 55%. During the current process the end-cap ratio of a polycarbonate produced during the filter alignment can increase. During the current process the end-cap ratio of a polycarbonate produced during the filter alignment can remain greater than or equal to 60%, specifically, greater than or equal to 65%, more specifically, greater than or equal to 75%, still more specifically, greater than or equal to 90%. Optionally, the end-cap ratio can be increased downstream from the filter via the addition of end-capping agents into the polymer, such as in an extruder. When the viscosity reducing agent is a diaryl carbonate, a dialkyl carbonate, an alkyl aryl carbonate, or a combination comprising one or more of the foregoing, the end-cap ratio can be increased relative to an initial end-cap ratio.

As used herein, the end-capping ratio in percent (% EC) is determined by the following equation:

$$\% \, EC = 100 - \left( \frac{ppm\text{OH} + \text{Mn}}{340,000} \right)$$

wherein ppm OH is the amount of hydroxyl end groups in ppm and Mn is the number averaged molecular weight based on polycarbonate standards in Daltons. The ppm OH can be determined by Fourier Transform Infrared Spectroscopy (FTIR), for example, on a Perkin Elmer FTIR Spectrum One Device by dissolving 0.5 grams (g) of the polycarbonate sample in 25 milliliters (mL) of dried chloroform, measuring the absorbance at a wavelength of 3,584 inverse centimeters ($cm^{-1}$) using a univariable calibration, and normalizing the absorbance by dividing the absorbance by the absorbance at 2,779 $cm^{-1}$.

The filtered polycarbonate can have a light transparency of greater than 89% as determined using 3.2 mm thick samples using ASTM D1003-00, Procedure B using CIE standard illuminant C, with unidirectional viewing. Accordingly, when the filtered polycarbonate has such a light transparency, it is herein referred to as an "optical grade" polycarbonate.

Set forth below are some embodiments of the present method for switching a filter in a polycarbonate polymerization process.

Embodiment 1

A PC polymerization process, comprising: interfacially polymerizing phosgene and a dihydroxy compound in the presence of a solvent, a chain stopper, and an interfacial catalyst to form a polycarbonate; adding a viscosity reducing agent and a transesterification catalyst to the polycarbonate upstream of a first filter to form an adjusted polycarbonate; replacing the first filter with a replacement filter; introducing the adjusted polycarbonate to the replacement filter; and reducing the addition rate of the viscosity reducing agent and the transesterification catalyst until the addition rate is 0 mol/hr.

Embodiment 2

The process of Embodiment 1, wherein replacing the first filter further comprises ceasing a PC flow to the first filter and aligning the replacement filter.

Embodiment 3

The process of Embodiment 2, wherein ceasing the PC flow comprises diverting the PC flow.

Embodiment 4

A PC polymerization process, comprising: interfacially polymerizing phosgene and dihydroxy compound in the presence of a solvent, a chain stopper, and an interfacial catalyst to form a PC; adding a viscosity reducing agent and a transesterification catalyst to the PC upstream of a first filter to form an adjusted PC; diverting the flow of the adjusted PC to a replacement filter; and reducing the addition rate of the viscosity reducing agent and the transesterification catalyst until the addition rate is 0 mol/hr.

Embodiment 5

The process of Embodiment 4, further comprising replacing the first filter with a second filter.

Embodiment 6

The process of any of the preceding Embodiments, wherein reducing the addition rate of the viscosity reducing agent further comprises monitoring a rate parameter, wherein the parameter is at least one of a pressure drop across the replacement filter and/or a stream parameter of the adjusted PC stream, wherein the rate at which the flow rate of the viscosity reducing agent is reduced is based upon the rate parameter.

Embodiment 7

The process of any of the preceding Embodiments, wherein the reducing occurs at a preprogrammed reduction rate.

Embodiment 8

The process of any of the preceding Embodiments, wherein the viscosity reducing agent is added to the polycarbonate so that the adjusted PC has an MVR of greater than or equal to 20 $cm^3$/10 min at 300° C. under a load of 1.2 kg according to ASTM D1238-04.

Embodiment 9

The process of any of the preceding Embodiments, wherein the amount of viscosity reducing agent is 0.05 to 1 wt % based on the total weight of the PC stream.

Embodiment 10

The process of any of Embodiments 8-9, wherein the MVR is 20 to 190 cm$^3$/10 min.

Embodiment 11

The process of any of Embodiments 8-10, wherein the MVR is 20 to 100 cm$^3$/10 min.

Embodiment 12

The process of any of the preceding Embodiments, wherein the viscosity reducing agent comprises an inert agent, an active agent, or a combination comprising one or both of the foregoing.

Embodiment 13

The process of any of the preceding Embodiments, wherein the viscosity reducing agent comprises a monomer used in the polymerization process, water, a solvent compatible with PC, a dialkyl carbonate, a diaryl carbonate, an alkyl aryl carbonate, an additional amount of a polymerization by-product, or a combination comprising one or more of the foregoing.

Embodiment 14

The process of any of the preceding Embodiments, wherein the PC is a homopolycarbonate derived from bisphenol A and diphenyl carbonate and the viscosity reducing agent comprises diphenyl carbonate, methyl phenyl carbonate, dimethyl carbonate, diethyl carbonate, ethyl phenyl carbonate, phenol, BPA, paracumyl phenol, p-tert butyl phenol, water, or a combination comprising one or more of the foregoing.

Embodiment 15

The process of any of the preceding Embodiments, wherein an end-cap ratio of PC in the adjusted PC stream is greater than or equal to 55%.

Embodiment 16

The process of Embodiment 15, wherein the end-cap ratio is greater than or equal to 65%.

Embodiment 17

The process of any of Embodiments 15-16, wherein the end-cap ratio is greater than or equal to 90%.

Embodiment 18

The process of any of the preceding Embodiments, wherein the viscosity reducing agent is a diaryl carbonate, a dialkyl carbonate, an alkyl aryl carbonate, or a combination comprising one or more of the foregoing and wherein the end-cap ratio increased relative to an initial end-cap ratio.

Embodiment 19

The process of any of the preceding Embodiments, wherein the process produces greater than or equal to 100,000 ton/yr of PC.

Embodiment 20

The process of any of the preceding Embodiments, wherein the interfacial catalyst comprises a tertiary amine

Embodiment 21

The process of any of the preceding Embodiments, wherein the interfacial polymerizing is a semi-batch or a continuous process.

Embodiment 22

The process of any of the preceding Embodiments, wherein the transesterification catalyst comprises tetramethyl phosphonium hydroxide, tetramethyl phosphonium acetate, tetramethyl phosphonium formate, tetrabutyl phosphonium hydroxide, TBPA, TPPA, TPPP, or a combination comprising one or more of the foregoing.

Embodiment 23

The process of any of the preceding Embodiments, wherein the transesterification catalyst comprises tetraphenyl phosphonium acetate, cesium carbonate, potassium hydroxide, sodium hydroxide, tetraphenyl phosphonium phenoxide, or a combination comprising one or more of the foregoing.

Embodiment 24

The process of any of the preceding Embodiments, wherein the adding a viscosity reducing agent occurs after the final polymerization of the PC.

Embodiment 25

The process of any of the preceding Embodiments, wherein the viscosity reducing agent comprises water.

Embodiment 26

The process of any of the preceding Embodiments, wherein the viscosity reducing agent comprises phenol.

Embodiment 27

The process of any of the preceding Embodiments, wherein the viscosity reducing agent comprises diphenyl carbonate.

Embodiment 28

The process of any of the preceding Embodiments, wherein the viscosity reducing agent is added to the polycarbonate so that the adjusted PC has an MVR of 20 cm$^3$/10 min to 40 cm$^3$/10 min, at 300° C. under a load of 1.2 kg according to ASTM D1238-04.

Embodiment 29

The process of any of the preceding Embodiments, wherein the viscosity reducing agent is added to the polycarbonate so that the adjusted PC has an MVR of greater than or equal to 30 cm³/10 min to 70 cm³/10 min, at 300° C. under a load of 1.2 kg according to ASTM D1238-04.

Embodiment 30

The process of any of the preceding Embodiments, wherein the viscosity reducing agent is added to the PC so that a change in pressure across the filter is less than or equal to 12 bars.

Embodiment 31

The process of any of the preceding Embodiments, wherein the viscosity reducing agent is added to the polycarbonate so that a change in pressure across the filter is less than or equal to 10 bars.

Embodiment 32

The process of any of the preceding Embodiments, wherein the interfacial catalyst comprises an aliphatic tertiary amine, a cycloaliphatic tertiary amine, an aromatic tertiary amine), or a combination comprising one or more of the foregoing.

Embodiment 33

The process of any of the preceding Embodiments, wherein the interfacial catalyst comprises triethylamine, tributylamine, N,N-diethyl-cyclohexylamine, N,N-dimethylaniline, a catalyst of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group, or a combination comprising one or more of the foregoing.

Embodiment 34

The process of any of the preceding Embodiments, further comprising devolatizing the PC.

Embodiment 35

The process of Embodiment 34, wherein the devolatizing comprises a flash devolatization step, devolatization extrusion step, a direct isolation step, a whipped film step, a dewatering extrusion step, a foaming devolatization step, a gel crush step, a hot water precipitation step, steam precipitation step, or a combination comprising one or more of the foregoing.

Embodiment 36

The process of Embodiment 35, wherein the devolatizing comprises the dewatering extrusion step.

Embodiment 37

The process of Embodiment 36, wherein the dewatering extrusion step comprises a steam precipitation of the polycarbonate followed by one of:
  feeding the PC directly to a devolatization extruder;
  devolatizing in a column dryer and then feeding to a devolatization extruder;
  compacting the PC in a chilsonator and then feeding the polycarbonate to a devolatization extruder; or devolatizing the PC in a column dryer, compacting the polycarbonate in a chilsonator, and feeding the PC to a devolatization extruder.

Embodiment 38

The process of any of Embodiments 35-37, wherein the devolatizing comprises the direct isolation step.

Embodiment 39

The process of Embodiment 38, wherein the direct isolation step comprises evaporating an organic solvent from a solution that contains the solvent and the PC to obtain a material system that contains 90 to 99.95 wt % PC based on the total weight of the system; passing the material system through inlet openings of a separating vessel to obtain a plurality of streams of PC; and degassing the streams in the separating vessel at a pressure of 0.1 to 20 mbar.

Embodiment 40

The process of Embodiment 38 or 39, wherein the direct isolation step comprises passing the PC through one of a combination of a tubular heat exchanger with one of a thin-film evaporator and a coiled tube evaporator; and a tubular heat exchanger, wherein the step optionally further comprises concentrating and degassing in a tubular heat exchanger having a downstream separator.

Embodiment 41

The process of any of Embodiments 35-40, wherein the devolatizing comprises stem precipitating.

Embodiment 42

The process of Embodiment 41, wherein the steam precipitating comprises a venture jet.

Embodiment 43

The process of any of Embodiments 41-42, wherein the stem precipitating occurs at 145 to 260° C. and 685 to 1,500 kPa gauge.

Embodiment 44

The process of any of Embodiments 41-43, wherein a weight ratio of steam to polycarbonate is 1 to 4 or 1.2 to 2.5.

Embodiment 45

The process of any of Embodiments 34-44, further comprising one or both of preheating prior to devolatizing and drying after devolatizing.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

This application claims the benefit of European Patent Application No. 14382472 filed 25 Nov. 2014. The related application is incorporated herein by reference.

We claim:

1. A method of switching filters in a polycarbonate polymerization process, comprising:
   interfacially polymerizing phosgene and a dihydroxy compound in the presence of a solvent, a chain stopper, and an interfacial catalyst to form a polycarbonate;
   temporarily adding a viscosity reducing agent and a transesterification catalyst to the polycarbonate upstream of a first filter to form an adjusted polycarbonate;
   replacing the first filter with a replacement filter;
   introducing the adjusted polycarbonate to the replacement filter; and
   reducing the addition rate of the viscosity reducing agent and the transesterification catalyst until the addition rate is 0 mol/hr.

2. A method of switching filters in a polycarbonate polymerization process, comprising:
   interfacially polymerizing phosgene and dihydroxy compound in the presence of a solvent, a chain stopper, and an interfacial catalyst to form a polycarbonate;
   temporarily adding a viscosity reducing agent and a transesterification catalyst to the polycarbonate upstream of a first filter to form an adjusted polycarbonate;
   diverting the flow of the adjusted polycarbonate to a replacement filter; and
   reducing the addition rate of the viscosity reducing agent and the transesterification catalyst until the addition rate is 0 mol/hr.

3. The process of claim 1, wherein reducing the addition rate of the viscosity reducing agent further comprises monitoring a rate parameter, wherein the parameter is at least one of a pressure drop across the replacement filter and/or a stream parameter of the adjusted polycarbonate stream, wherein the rate at which the flow rate of the viscosity reducing agent is reduced is based upon the rate parameter.

4. The process of claim 1, wherein the reducing occurs at a preprogrammed reduction rate.

5. The process of claim 1, wherein the viscosity reducing agent is added to the polycarbonate so that the adjusted polycarbonate has an MVR of greater than or equal to 20 cm$^3$/10 min at 300° C. under a load of 1.2 kg according to ASTM D1238-04.

6. The process of claim 1, wherein the amount of viscosity reducing agent is 0.05 to 1 wt % based on the total weight of the polycarbonate stream.

7. The process of claim 1, wherein the viscosity reducing agent comprises a monomer used in the polymerization process, water, a solvent compatible with polycarbonate, a dialkyl carbonate, a diaryl carbonate, an alkyl aryl carbonate, an additional amount of a polymerization by-product, or a combination comprising one or more of the foregoing.

8. The process of claim 1, wherein an end-cap ratio of polycarbonate in the adjusted polycarbonate stream is greater than or equal to 55%.

9. The process of claim 1, wherein the viscosity reducing agent comprises a diaryl carbonate, a dialkyl carbonate, an alkyl aryl carbonate, or a combination comprising one or more of the foregoing and wherein the end-cap ratio increased relative to an initial end-cap ratio.

10. The process of claim 1, wherein the adding a viscosity reducing agent occurs after the final polymerization of the polycarbonate.

11. The process of claim 1, wherein the viscosity reducing agent comprises water, phenol, diphenyl carbonate, or a combination comprising one or more of the foregoing.

12. The process of claim 1, wherein the viscosity reducing agent is added to the polycarbonate so that the adjusted polycarbonate has an MVR of 20 cm$^3$/10 min to 70 cm$^3$/10 min, at 300° C. under a load of 1.2 kg according to ASTM D1238-04.

13. The process of claim 1, wherein the viscosity reducing agent is added to the polycarbonate so that a change in pressure across the filter is less than or equal to 12 bars.

14. The process of claim 1, further comprising devolatizing the polycarbonate, wherein the devolatizing comprises a flash devolatization step, devolatization extrusion step, a direct isolation step, a whipped film step, a dewatering extrusion step, a foaming devolatization step, a gel crush step, a hot water precipitation step, a steam precipitation step, or a combination comprising one or more of the foregoing.

15. The process of claim 14, wherein the devolatizing comprises the dewatering extrusion step, wherein the dewatering extrusion comprises a steam precipitation of the polycarbonate followed by one of:
   feeding the polycarbonate directly to a devolatization extruder;
   devolatizing in a column dryer and then feeding to a devolatization extruder;
   compacting the polycarbonate in a chilsonator and then feeding the polycarbonate to a devolatization extruder; or devolatizing the polycarbonate in a column dryer, compacting the polycarbonate in a chilsonator, and feeding the polycarbonate to a devolatization extruder.

16. The process of claim 14, wherein the devolatizing comprising the direct isolation step, wherein the direct isolation step comprises evaporating an organic solvent from a solution that contains the solvent and the polycarbonate to obtain a material system that contains 90 to 99.95 wt % polycarbonate based on the total weight of the system; passing the material system through inlet openings of a separating vessel to obtain a plurality of streams of polycarbonate; and degassing the streams in the separating vessel at a pressure of 0.1 to 20 mbar or wherein the direct isolation step comprises passing the polycarbonate through one of a combination of a tubular heat exchanger with one of a thin-film evaporator and a coiled tube evaporator; and a tubular heat exchanger, wherein the step optionally further comprises concentrating and degassing in a tubular heat exchanger having a downstream separator.

* * * * *